United States Patent
Skubic et al.

(10) Patent No.: US 7,644,045 B2
(45) Date of Patent: Jan. 5, 2010

(54) METHOD AND APPARATUS FOR BUYER IDENTIFICATION

(75) Inventors: Janez Skubic, Hasselby (SE); Patric Lind, Lund (SE); Nils Rydbeck, Cary, NC (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 11/110,039

(22) Filed: Apr. 20, 2005

(65) Prior Publication Data

US 2005/0216423 A1  Sep. 29, 2005

Related U.S. Application Data

(63) Continuation of application No. 09/578,257, filed on May 24, 2000, now abandoned.

(51) Int. Cl.
G06F 17/60 (2006.01)

(52) U.S. Cl. .............................. 705/75; 705/64; 705/67; 705/76

(58) Field of Classification Search .................. 705/64, 705/67, 75, 76
See application file for complete search history.

(56) References Cited

U.S. PATENT DOCUMENTS

| | | | |
|---|---|---|---|
| 4,993,068 A | 2/1991 | Piosenka et al. | |
| 5,870,723 A | 2/1999 | Pare, Jr. et al. | |
| 5,878,144 A | 3/1999 | Aucsmith et al. | |
| 6,016,476 A | 1/2000 | Maes et al. | |
| 6,023,241 A | 2/2000 | Clapper | |
| 6,040,783 A | 3/2000 | Houvener et al. | |
| 6,181,803 B1 | 1/2001 | Davis | |
| 6,202,055 B1 | 3/2001 | Houvener et al. | |
| 2003/0195847 A1* | 10/2003 | Felger | 705/40 |
| 2005/0251440 A1* | 11/2005 | Bednarek | 705/10 |
| 2007/0073621 A1* | 3/2007 | Dulin et al. | 705/50 |

FOREIGN PATENT DOCUMENTS

| | | |
|---|---|---|
| DE | 19846452 A1 | 12/1999 |
| EP | 0869637 A2 | 10/1998 |
| EP | RS 105225US | 12/2000 |
| GB | 2273629 A | 6/1994 |
| JP | 2003178203 A * | 6/2003 |
| WO | WO-00/21020 | 4/2000 |

OTHER PUBLICATIONS

R. Barber, "Security in a Mobile World—Is Bluetooth the Answer", Computers & Security, International Journal Devoted to the Study of Technical and Financial Aspects of Computer Security, NL, Elsevier Science Publishers, Amsterdam, vol. 19, No. 4, Apr. 2000, pp. 321-325, XP004201797.

N. Flaherty, "Philips uses Bluetooth for baseband device," Electronic Times; London; Feb. 13, 1999.

* cited by examiner

Primary Examiner—Pierre E Elisca
(74) Attorney, Agent, or Firm—Michael G. Cameron

(57) ABSTRACT

The present invention comprises an apparatus and method for generating and storing an electronic portrait of a buyer within a personal device such as a mobile telephone. An electronic portrait enables the generation of a physical identifier for comparison to the buyer by a seller during a transaction. Using the physical identifier transmitted to the seller via a wireless communications link, the seller can establish whether or not the buyer is authorized to make the transaction.

32 Claims, 2 Drawing Sheets

METHOD AND APPARATUS FOR BUYER IDENTIFICATION

BACKGROUND OF THE INVENTION

1. Technical Field of the Invention

The present invention relates to methods for identification of a buyer during a face to face sales transaction, and more particularly, to a method for electronically establishing an identity of a buyer during a face to face sales transaction.

2. Description of Related Art

Transactions within a physical store are accomplished using cash payments, invoicing, check payments or credit cards. The development of technologies in the mobile telephone and electronic personal device area have also presented the potential for the use of these components as payment devices in addition to their normal functions. The major problem encountered within transactions in which cash is not exchanged between a buyer and seller is the necessity to properly identity the buyer in a secure manner. Identification is needed when a buyer and seller require one of the parties to be identified. For example, if a transaction is completed between more than one buyer and/or seller, the parties need to ascertain that each party is who they say they are.

Existing methods of identification include 1) a buyer identifying himself to a seller by means of an identity card, 2) a buyer signing a document stating the buyer's identity, 3) via a third party identifying the buyer, 4) via a previously agreed code or visible decal stating the identity of the buyer. Unfortunately, none of these methods are particularly well adapted to a personal device such as a mobile telephone or electronic personal device. Furthermore, each of these methods are subject to fraud on the part of the buyer who may lie about their identity or have stolen a previously agreed code or decal identifying the buyer. Thus, there is a need for an improved buyer identification apparatus and method which may ideally be implemented in electronic personal devices and mobile telephones.

SUMMARY OF THE INVENTION

The present invention comprises a method and apparatus for enabling an identification of a buyer during a transaction. An electronic portrait of a buyer is generated and stored within an electronic personal device or a mobile telephone. An electronic portrait enables generation of a physical identifier for comparison to the buyer by a seller during a transaction. Upon initiation of a transaction between a buyer and a seller, the personal device establishes a wireless communications link between the personal device and the seller's equipment. The electronic portrait stored within the personal device is transmitted to the seller's equipment where it is used to generate the physical identifier. Alternatively, an identifier enabling access to a remotely stored electronic portrait may be transmitted to the seller. The physical identifier is presented to the seller to enable a comparison of the physical identifier with the particular physical characteristics of the buyer represented by the physical identifier. If the physical identifier matches the buyer, the transaction is completed. In this manner, a seller is able have a physical confirmation of the authenticity of the buyer in a manner that substantially limits the possibility of fraudulent transactions.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
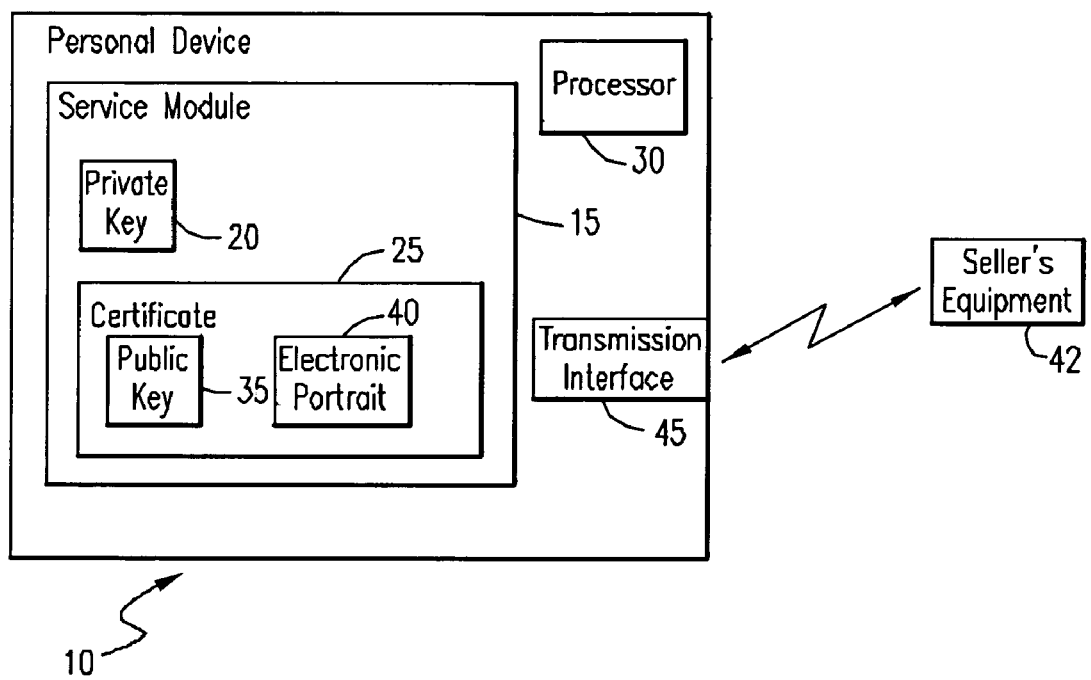
FIG. 1 is a functional block diagram of a personal device, such as an electronic personal device or a mobile telephone, for implementing the electronic portrait of the present invention.

Referring now to the drawings, and more particular to FIG. 1, there is illustrated a functional block diagram of a personal device 10 for implementing an electronic portrait of the present invention. The personal device 10 includes a service module 15 stored within a memory of the personal device 10. The service module 15 is issued by an issuer which may be an individual or organization responsible for guaranteeing the payment of fees for services or products purchased by the buyer. The issuer can be an ID card provider, payment provider, credit card company, bank, etc. that has an interest in insuring the buyer is properly identified to prevent fraudulent purchases for which the issuer may ultimately bear responsibility.

The service module 15 includes information that describes the relationship between the buyer and the issuer. The service module 15 further includes at least one private key 20 and a certificate 25. The private key 20 is an encryption tool which when combined with a public key received from the seller's equipment 42 enables the personal device 10 to encrypt information transmitted between the personal device 10 and a seller's equipment 42 via a wireless transmission interface 45 (Bluetooth™) using a processing device 30. The certificate 25 includes a public key 35 for use in decryption processes by the processor 30 for data transmitted between the personal device 10 and a seller's equipment 42.

The certificate 25 further includes, or has linked thereto in a secure fashion, a buyer's electronic portrait 40. The electronic portrait 40 is created by an issuer or an agent of the issuer and provides a manner for providing a physical identification of a buyer. The electronic portrait 40 may be stored in a secure fashion to preserve the portrait's integrity and/or confidentiality utilizing cryptographic storage. The electronic portrait may further be digitally signed to provide further security. The buyer's electronic portrait 40 consists of electronically stored information that provides a seller with some manner of physical identifier associating the buyer with the electronically stored information. Examples of physical identifiers include an electronic photo of the buyer, a graphic imprint of the buyer, a mathematical imprint of the buyer, a verbal description of the buyer, an electronic audio imprint of the buyer, an electronic video imprint of the buyer, or any combination of the above or other methods. Rather than being stored within the personal device 10, the electronic portrait 40 may also be stored remotely at a site accessible via the Internet, a Wide Area Network, telephone network, etc. In this case a web site address, telephone number, etc. would direct a merchant to a site storing the full electronic portrait.

Figure 2:
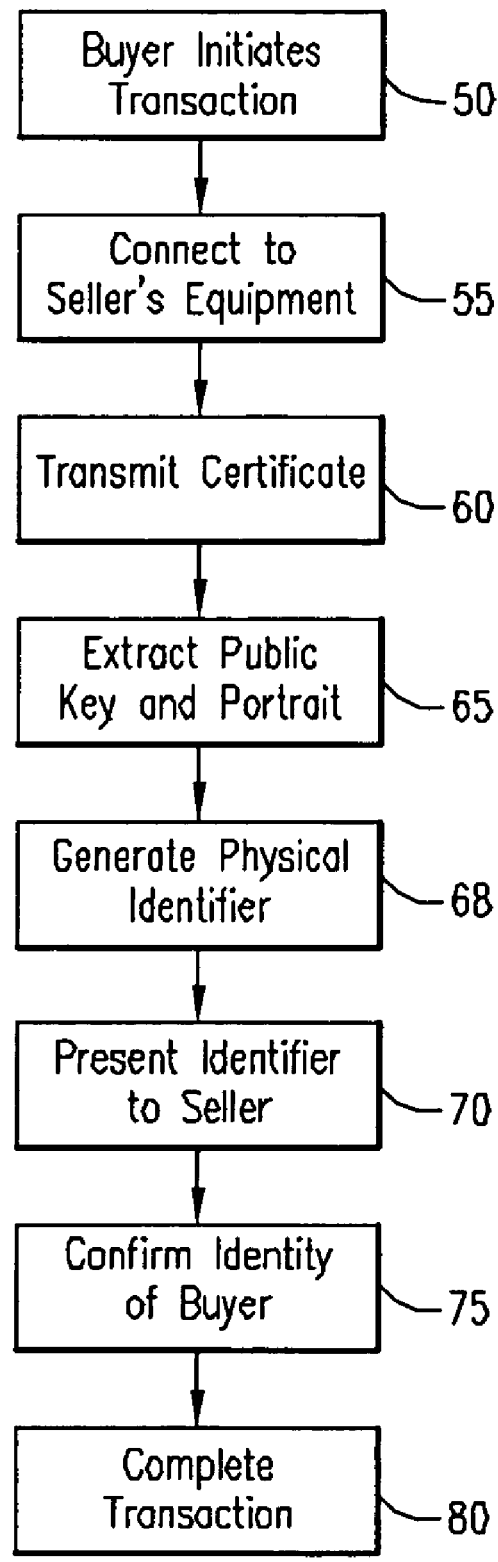
FIG. 2 is a flow diagram illustrating the process for identifying a buyer using an electronic portrait.

Referring now to FIG. 2, there is illustrated a flow diagram describing a method for a buyer to carry out a purchase utilizing the electronic portrait 40 of the present invention. The buyer and seller are within the same physical location such as a store, market, office or trading room. Once the buyer initiates a transaction at step 50, the buyer is required connect at step 55 their personal device to the seller's equipment 42. The interconnection between the personal device 10 and the seller's equipment 42 may be via a wired connection or a wireless connection. If a wireless/short range wireless connection is used, the connection may comprise, for example, an RF, infrared or Bluetooth™ system connection. In order to establish the connection, the buyer may be required to place their personal device 10 with a shielded area. The shielded area would protect the personal device 10 from establishing a wireless access (Bluetooth™ access) with other devices, this would assure the seller that the electronic portrait 40 received was the electronic portrait from the personal device 10 in the shielded area. Once the personal device 10 is interconnected with the seller's equipment 42, the certificate 25, including the public key 35 and electronic portrait 40, is transmitted at step 60 to the seller's equipment 40. The transmission of the certificate 25 to the seller's equipment 42 may be automatic, buyer initiated, or seller initiated.

Upon receipt of the certificate 25 from the personal device 10, the seller's equipment 42 extracts the public key 35 and electronic portrait 40 from the certificate 25 at step 65. The extracted electronic portrait 40 is used to generate a physical identifier at step 68, and the identifier is presented to the seller at step 70 via some type of visual or audio display means depending upon the form of the electronic portrait. The seller utilizes the physical identifier of the buyer to confirm the identity of the buyer at step 75. If the electronic portrait 40 confirms the identity of the buyer, the transaction may be completed at step 80.

The previous description is of a preferred embodiment for implementing the invention, and the scope of the invention should not necessarily be limited by this description. The scope of the present invention is instead defined by the following claims.

What is claimed is:

1. A method for enabling identification of a buyer to be used in conjunction with a face to face sales transaction, comprising the steps of:
  receiving, by a personal device of a buyer, from equipment of a seller, a public key that enables the personal device to encrypt information sent between the personal device of a buyer and the equipment of a seller;
  generating an electronic portrait of a buyer, the electronic portrait enabling generation of a physical identifier for comparison to the buyer by a seller during the sales transaction;
  storing the electronic portrait within a digital certificate in a personal device to enable access of the electronic portrait by the seller during the sales transaction wherein the personal device includes a service module stored within a memory of the personal device issued by an issuer that guarantees payment, the service module including at least one private key and the digital certificate, wherein the private key is an encryption tool which, when combined with the public key received from equipment of a seller enables the personal device to encrypt information transmitted between the personal device and the equipment of the seller via a wireless interface; and
  transmitting the electronic portrait to the seller via the wireless interface during the sales transaction.

2. The method of claim 1, wherein the step of storing further comprises the step of storing the electronic portrait in an encrypted format within the personal device.

3. The method of claim 1, wherein the electronic portrait comprises at least one of:
  an electronic photo of the buyer;
  a graphic imprint of the buyer;
  a mathematical imprint of the buyer;
  a verbal description of the buyer;
  an electronic audio imprint of the buyer; and
  an electronic video imprint of the buyer.

4. The method of claim 1, wherein the personal device comprises at least one of a mobile telephone or an electronic personal device.

5. The method of claim 1, further including the step of placing the electronic device in a shielded area associated with the seller prior to transmitting the electronic portrait.

6. The method of claim 1, wherein the step of storing further comprises the steps of:
  storing the electronic portrait at a remote location accessible via the personal device; and
  storing an identifier within the personal device enabling access to the electronic portrait at the remote location.

7. The method of claim 1, wherein the wireless interface comprises a Bluetooth interface.

8. A method for enabling identification of a buyer to be used in conjunction with a sales transaction, comprising the steps of:
  receiving, by a personal device of a buyer, from equipment of a seller, a public key that enables the personal device to encrypt information sent between the personal device of a buyer and the equipment of a seller;
  receiving an electronic portrait contained within a digital certificate from the personal device via a short range wireless interface, the electronic portrait enabling generation of a physical identifier for comparison to the buyer by the seller using equipment of the seller wherein the personal device includes a service module stored within a memory of the personal device issued by an issuer that guarantees payment, the service module including at least one private key and the digital certificate, wherein the private key is an encryption tool which, when combined with the public key received from equipment of a seller enables the personal device to encrypt information transmitted between the personal device and the equipment of the seller via the wireless interface;
  generating the physical identifier from the received electronic portrait;
  displaying the physical identifier to the seller using equipment of the seller; and
  completing the sales transaction if the physical identifier corresponds to the buyer.

9. The method of claim 8 further comprising the step of interconnecting with a personal device containing the electronic portrait via the Bluetooth interface.

10. The method of claim 8 further comprising the step of decrypting the electronic portrait.

11. The method of claim 8, wherein the electronic portrait comprises at least one of:
  an electronic photo of the buyer;
  a graphic imprint of the buyer;
  a mathematical imprint of the buyer;
  a verbal description of the buyer;
  an electronic audio imprint of the buyer; and
  an electronic video imprint of the buyer.

12. The method of claim 8, wherein the personal device comprises at least one of a mobile telephone or an electronic personal device.

13. The method of claim 8 further comprising the steps of comparing the physical identifier to the buyer.

14. The method of claim 8, wherein the step of receiving further comprises receiving from the personal device which is located in a shielded area.

15. The method of claim 8, wherein the step of receiving further includes the steps of:

receiving an identifier enabling access to a location remote from the personal device containing the electronic portrait; and accessing the electronic portrait using the identifier.

16. The method of claim 8, wherein the short range wireless interface comprises a Bluetooth interface.

17. A method for enabling identification of a buyer to be used in conjunction with a sales transaction comprising the steps of:

receiving, by a personal device of a buyer, from equipment of a seller, a public key that enables the personal device to encrypt information sent between the personal device of a buyer and the equipment of a seller;

generating an electronic portrait of a buyer, the electronic portrait enabling generation of a physical identifier for comparison to the buyer by a seller;

storing the electronic portrait within a digital certificate in the personal device to enable access of the electronic portrait by the seller during the sales transaction wherein the personal device includes a service module stored within a memory of the personal device issued by an issuer that guarantees payment, the service module including at least one private key and the digital certificate, wherein the private key is an encryption tool which, when combined with the public key received from equipment of a seller enables the personal device to encrypt information transmitted between the personal device and the equipment of the seller via a wireless interface;

establishing a wireless communications link between a personal device and the seller;

receiving the electronic portrait from a buyer via the Bluetooth communications link;

generating the physical identifier from the received electronic portrait;

displaying the physical identifier to the seller on equipment of the seller; and completing the sales transaction if the physical identifier corresponds to the buyer.

18. The method of claim 17, wherein the step of storing further comprises the step of storing the electronic portrait in an encrypted format within the personal device.

19. The method of claim 17 further comprising the step of decrypting the electronic portrait.

20. The method of claim 17, wherein the electronic portrait comprises at least one of:

an electronic photo of the buyer;

a graphic imprint of the buyer;

a mathematical imprint of the buyer;

a verbal description of the buyer;

an electronic audio imprint of the buyer; and an electronic video imprint of the buyer.

21. The method of claim 17, wherein the personal device comprises at least one of a mobile telephone or an electronic personal device.

22. The method of claim 17, further comprising the step of comparing the physical identifier to the buyer.

23. The method of claim 17, further including the step of placing the electronic device in a shielded area associated with the seller prior to transmitting the electronic portrait.

24. The method of claim 17, wherein the step of storing further comprises the steps of:

storing the electronic portrait at a remote location accessible via the personal device; and storing an identifier within the personal device enabling access to the electronic portrait at the remote location.

25. The method of claim 17, wherein the step of receiving further includes the steps of:

receiving an identifier enabling access to a location remote from the personal device containing the electronic portrait; and accessing the electronic portrait using the identifier.

26. The method of claim 17, wherein the wireless interface comprises a Bluetooth interface.

27. An electronic personal device enabling identification of a buyer to be used in conjunction with a sales transaction comprising:

a memory;

an electronic portrait stored within the memory, the electronic portrait enabling generation of a physical identifier for comparison to the buyer by a seller during the sales transaction, wherein the personal device includes a service module stored within the memory of the personal device issued by an issuer that guarantees payment, the service module including at least one private key and the digital certificate, wherein the private key is an encryption tool which, when combined with the public key received from equipment of a seller enables the personal device to encrypt information transmitted between the personal device and the equipment of the seller via a wireless interface; and transmission circuitry enabling a wireless communications link between the buyer and the seller for transmission of the electronic portrait.

28. The electronic personal device of claim 27, further including a public key associated with the electronic portrait.

29. The electronic personal device of claim 27, wherein the electronic portrait is part of a certificate.

30. The electronic personal device of claim 27, wherein the electronic portrait is part of a service module.

31. The electronic personal device of claim 27, wherein the personal device comprises a mobile telephone.

32. The electronic personnel device of claim 27, wherein the wireless communication link comprises a Bluetooth interface.

* * * * *